(12) United States Patent
Moromi (10) Patent No.: US 12,503,206 B2
(45) Date of Patent: Dec. 23, 2025

(54) SPEED CONTROL METHOD FOR MARINE VESSEL, AND MARINE VESSEL

(71) Applicant: YAMAHA HATSUDOKI KABUSHIKI KAISHA, Iwata (JP)

(72) Inventor: Syuichi Moromi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 352 days.

(21) Appl. No.: 18/127,145

(22) Filed: Mar. 28, 2023

(65) Prior Publication Data

US 2023/0339582 A1     Oct. 26, 2023

(30) Foreign Application Priority Data

Apr. 21, 2022   (JP) .................................. 2022-070084

(51) Int. Cl.
*B63B 79/40* (2020.01)
*B63H 21/21* (2006.01)

(52) U.S. Cl.
CPC ............. *B63B 79/40* (2020.01); *B63H 21/21* (2013.01); *B63H 2021/216* (2013.01)

(58) Field of Classification Search
CPC .... B63B 79/40; B63H 21/21; B63H 2021/216
USPC ........................................................ 701/21
See application file for complete search history.

(56) References Cited

U.S. PATENT DOCUMENTS

| | | | |
|---|---|---|---|
| 2009/0298359 | A1 | 12/2009 | Hiroshima et al. |
| 2010/0057279 | A1* | 3/2010 | Kyllingstad ......... G05D 1/0208 702/96 |
| 2021/0394877 | A1 | 12/2021 | Kadota et al. |

FOREIGN PATENT DOCUMENTS

| | | | |
|---|---|---|---|
| JP | 06-211190 | A | 8/1994 |
| JP | 2002-370694 | A | 12/2002 |
| JP | 2004291688 | A * | 10/2004 |
| JP | 2009115714 | A * | 5/2009 |
| JP | 5138469 | B2 | 2/2013 |
| JP | 2013-180682 | A | 9/2013 |
| JP | 2014-136509 | A | 7/2014 |
| JP | 2020-083125 | A | 6/2020 |
| JP | 2021-195076 | A | 12/2021 |

OTHER PUBLICATIONS

Godhavn, J.-M. "High Quality Heave Measurements Based on GPS RTK and Accelerometer Technology." Oceans 2000 MTS/IEEE Conference and Exhibition. Conference Proceedings (Cat. No. 00CH37158). vol. 1. IEEE, 2000. 309-314 vol. 1. Web. (Year: 2000).*
Mudin, Y et al. "Extreme Wave Height Analysis Using Weibull and Rayleigh Distribution in Some Coastal Areas Affected by Tsunami Disasters and Earthquakes in Sep. 2018 at Central Sulawesi." Journal of physics. Conference series 1763.1 (2021): 12026. Web. (Year: 2021).*

(Continued)

*Primary Examiner* — Khoi H Tran
(74) *Attorney, Agent, or Firm* — Keating & Bennett, LLP (57) ABSTRACT

A speed control method to control a speed of a marine vessel includes determining a vessel speed based on a first moving average value which is a moving average value of a vertical speed of a hull, or a moving average value of a vertical acceleration of the hull, and based on an occurrence probability density distribution of a wave height.

12 Claims, 9 Drawing Sheets

(56) References Cited

OTHER PUBLICATIONS

Mase S. "Hull speed control system and method." Machine Translation available from Global Dossier (Year: 2004).*

Hayashi, M et al. "Method and apparatus for measuring the speed of a moving body." Machine Translation available from Global Dossier (Year: 2009).*

Official Communication issued in corresponding European Patent Application No. 23168453.1, mailed on Oct. 10, 2023.

\* cited by examiner

SPEED CONTROL METHOD FOR MARINE VESSEL, AND MARINE VESSEL

CROSS REFERENCE TO RELATED APPLICATIONS

This application claims the benefit of Japanese Patent Application No. 2022-070084, filed on Apr. 21, 2022, which is hereby incorporated by reference wherein in its entirety.

BACKGROUND OF THE INVENTION

1. Field of the Invention

The present invention relates to a speed control method for a marine vessel traveling on waves, and a marine vessel.

2. Description of the Related Art

In a case where a relatively small marine vessel travels on waves, when the vessel speed of the marine vessel is increased, a hull may be impacted since the hull collides with a wave or falls onto the water after riding on the wave. In a case where the hull travels over the wave, the vessel speed decreases when the hull rises toward the top of the wave, and the vessel speed increases when the hull descends toward the valley of the wave. Therefore, the ride comfort of the marine vessel is deteriorated.

Accordingly, a technique of controlling the vessel speed according to behavior of the marine vessel on waves has been proposed. For example, in the technique described in Japanese Laid-open Patent Publication (Kokai) No. H6-211190, in a case where the acceleration of the hull in a vertical direction exceeds a limit value, a deceleration command is transmitted to a main engine to decelerate the vessel speed to a predetermined value at which the hull will not be damaged. In the technique described in Japanese Patent No. 5138469, when the acceleration in a gravity direction increases, the correction amount for the rotation speed of the engine is calculated such that the traveling speed of the marine vessel increases. In the technique described in Japanese Laid-open Patent Publication (Kokai) No. 2004-291688, when the pitching angular velocity is positive, the hull is decelerated depending on a wave height. Therefore, the engine control for accelerating the hull is performed.

However, in the techniques described in Japanese Laid-open Patent Publication (Kokai) No. H6-211190, Japanese Patent No. 5138469, and Japanese Laid-open Patent Publication (Kokai) No. 2004-291688, since the vessel speed is changed according to changes in acceleration and pitching angular velocity, which is caused by each of the waves, the vessel speed varies from moment to moment every time the marine vessel encounters the wave, and thus acceleration and deceleration of the hull are frequently repeated. Therefore, there is still need for improvement of the ride comfort of the marine vessel when the marine vessel travels on waves.

SUMMARY OF THE INVENTION

Preferred embodiments of the present invention further improve the ride comfort of marine vessels traveling on waves.

According to a preferred embodiment of the present invention, a speed control method to control a speed of a marine vessel includes determining a vessel speed based on a first moving average value which is a moving average value of a vertical speed of a hull, or a moving average value of a vertical acceleration of the hull, and based on an occurrence probability density distribution of a wave height.

According to another preferred embodiment of the present invention, the speed control method includes determining a vessel speed based on a moving average value of a vertical speed of a hull.

According to the above description, the vessel speed is determined based on the moving average value of the vertical speed or the vertical acceleration of the hull. The moving average value of the vertical speed and the vertical acceleration of the hull does not vary from moment to moment every time the marine vessel travels over the wave, as is distinct from the vertical speed of the hull itself or the vertical acceleration itself. Therefore, the vessel speed determined based on the moving average value of the vertical speed or vertical acceleration of the hull does not vary from moment to moment and changes relatively smoothly. As a result, according to a preferred embodiment of the present using the moving average value of the vertical speed or the vertical acceleration of the hull, it is possible to prevent the acceleration and deceleration of the hull from being repeated frequently, and thus, it is possible to further improve the ride comfort of the marine vessel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
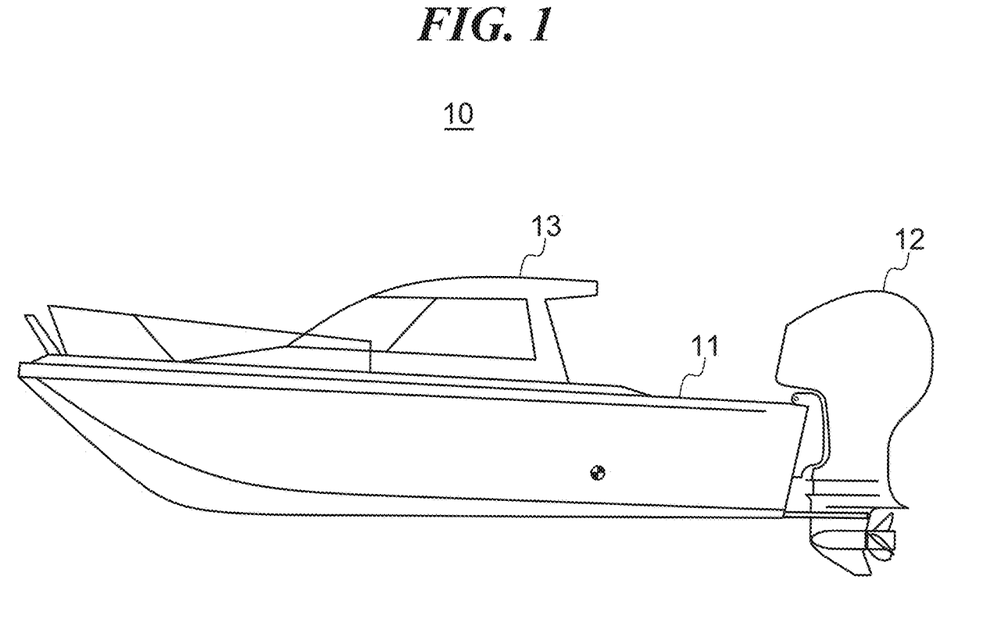
FIG. 1 is a side view of a marine vessel to which a speed control method for a marine vessel according to a preferred embodiment of the present invention is applied.

Hereinafter, preferred embodiments of the present invention will be described with reference to the drawings. FIG. 1 is a side view of a marine vessel 10 to which a speed control method for a marine vessel according to a preferred embodiment of the present invention is applied. In FIG. 1, the marine vessel 10 is, for example, a planing boat, and includes a hull 11 and at least one, for example, two outboard motors 12 as propulsion devices attached to a stern of the hull 11. Each of the outboard motors 12 generates a propulsive force of the marine vessel 10 by rotating a screw propeller. A cabin 13 serving as a cockpit is provided on the hull 11.

Figure 2:
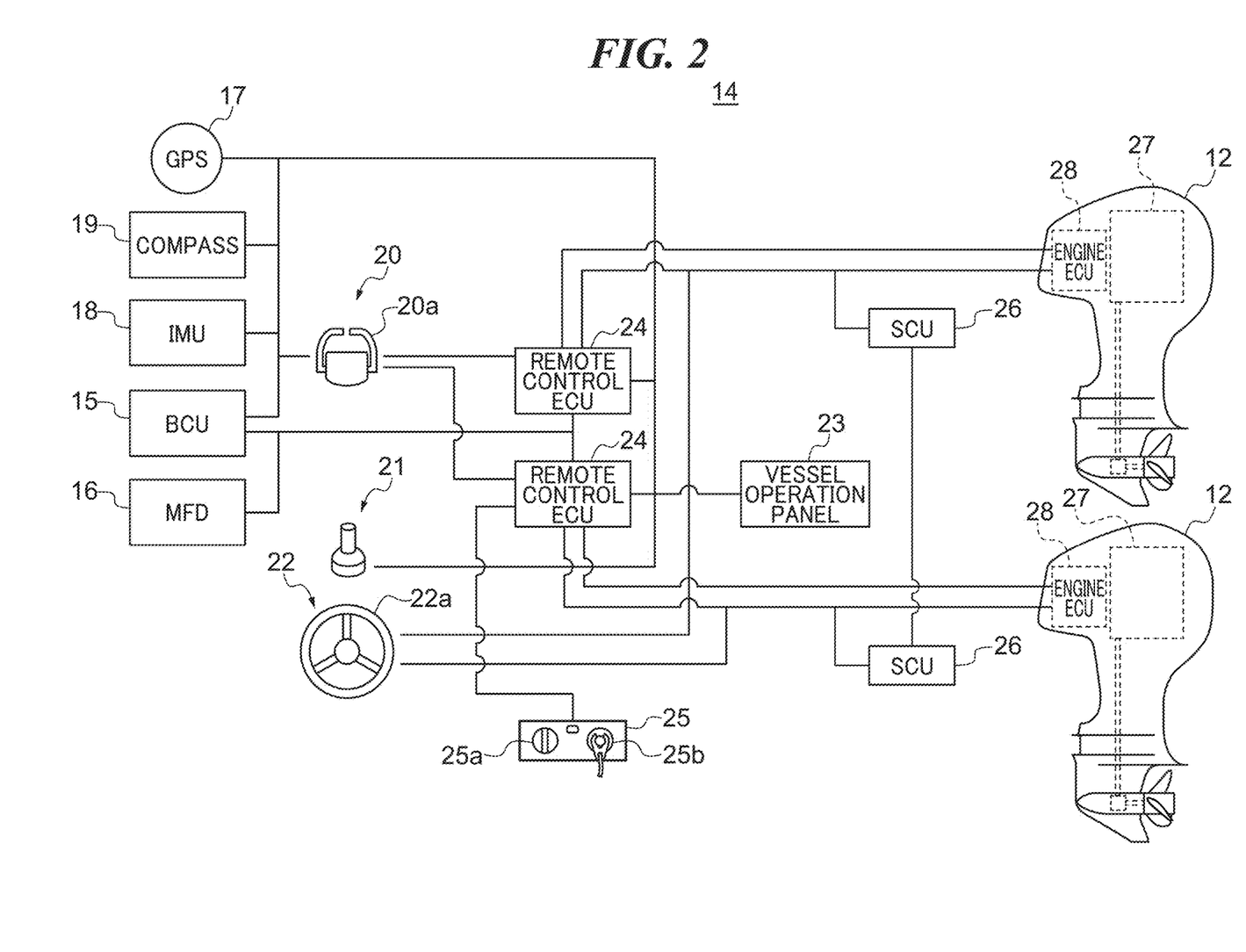
FIG. 2 is a block diagram schematically illustrating a configuration of a marine vessel propulsion control system mounted on the marine vessel in FIG. 1.

FIG. 2 is a block diagram schematically illustrating a configuration of a marine vessel propulsion control system 14 mounted on the marine vessel 10 in FIG. 1. Referring to FIG. 2, the marine vessel propulsion control system 14 includes outboard motors 12, a boat control unit (BCU) 15 (controller), a multi-function display (MFD) 16, a GPS 17, an inertial measurement unit (IMU) 18, a compass 19, a remote control unit 20, a joystick 21, a steering mechanism 22, a vessel operation panel 23, remote control ECUs 24, a main operation unit 25, and steering control units (SCUs) 26. The components of the marine vessel propulsion control system 14 are communicatively connected to each other.

The GPS 17 obtains a current position of the marine vessel 10 and transmits the current position of the marine vessel 10 to the BCU 15. The IMU 18 measures the behavior of the hull 11 and transmits the measurement result to the BCU 15. The compass 19 obtains a bearing of the marine vessel 10 and transmits the bearing of the marine vessel 10 to the BCU 15.

The remote control unit 20 includes a lever 20a corresponding to each of the outboard motors 12. The vessel operator is able to switch the acting direction of the propulsive force generated by each of the corresponding outboard motors 12 to a forward/backward direction and adjust the magnitude of the output of the corresponding outboard motor 12 to adjust the vessel speed by operating each lever 20a. At this time, the remote control unit 20 transmits a signal to control the outboard motor 12 in response to the operation of the lever 20a to the BCU 15 and/or the remote control ECUs 24. The joystick 21, which is a control stick to maneuver the marine vessel 10, transmits a signal to move the marine vessel 10 in the tilting direction of the control stick to the BCU 15 and the remote control ECUs 24. The steering mechanism 22 allows the vessel operator to determine the course of the marine vessel 10. The vessel operator is able to turn the marine vessel 10 to the right and left by rotating a steering wheel 22a of the steering mechanism 22 in a clockwise direction or counterclockwise direction. At this time, the steering mechanism 22 transmits a steering angle corresponding to the rotation operation of the steering wheel 22a to the remote control ECUs 24 or the SCUs 26.

The main operation unit 25 includes a main switch 25a and an engine shut-off switch 25b. The main switch 25a is an operator to collectively start and stop engines 27 which are power sources of the outboard motors 12, and the engine shut-off switch 25b is a switch to urgently stop the engine of each of the outboard motors 12. The MFD 16 includes, for example, a color LCD display, and functions as a display to display various types of information and also functions as a touch panel to receive an input from a vessel operator. The vessel operation panel 23 includes switches (not illustrated) corresponding to various vessel operation modes. The vessel operator operates the corresponding switch to shift the mode of the marine vessel 10 to a desired vessel operation mode. Each of the SCUs 26 is provided corresponding to each of the outboard motors 12, and controls a steering unit (not illustrated) that horizontally turns the corresponding outboard motor 12 with respect to the hull 11 of the marine vessel 10 to change the acting direction of the propulsive force of each of the outboard motors 12.

The BCU 15 obtains the situation of the marine vessel 10 based on signals transmitted from the respective components of the marine vessel propulsion control system 14, determines the magnitude of the propulsive force to be generated by each of the outboard motors 12 and the acting direction of the propulsive force to be taken, and transmits the result of the determination to each of the remote control ECUs 24. One remote control ECU 24 is provided correspondingly to each of the outboard motors 12. Each of the remote control ECUs 24 transmits a signal to control the engine 27 or each steering unit of each of the outboard motors 12 to an engine ECU 28 or the SCU 26 of each of the outboard motors 12 in response to a signal transmitted from the BCU 15, the steering mechanism 22, the remote control unit 20, and the joystick 21, and adjusts the magnitude and the acting direction of the propulsive force of each of the outboard motors 12. The BCU 15 executes the speed control method for the marine vessel according to a preferred embodiment of the present invention.

In the speed control method for the main vessel, in order to mitigate impacts applied to the hull 11 when the marine vessel 10 travels over the waves, feedback control is performed in which a target vessel speed is calculated based on a vertical speed (hereinafter, referred to as "set vertical speed") of the hull 11, which corresponds to an allowable vertical acceleration (degree of impact to the hull 11) set by the vessel operator and the maximum vertical speed of the hull 11, which is assumed from the measured vertical speed of the hull 11, and the rotation speed of the engine 27, which corresponds to the propulsive force of the outboard motor 12, is determined based on a difference between the target vessel speed and the current vessel speed.

Figure 3:
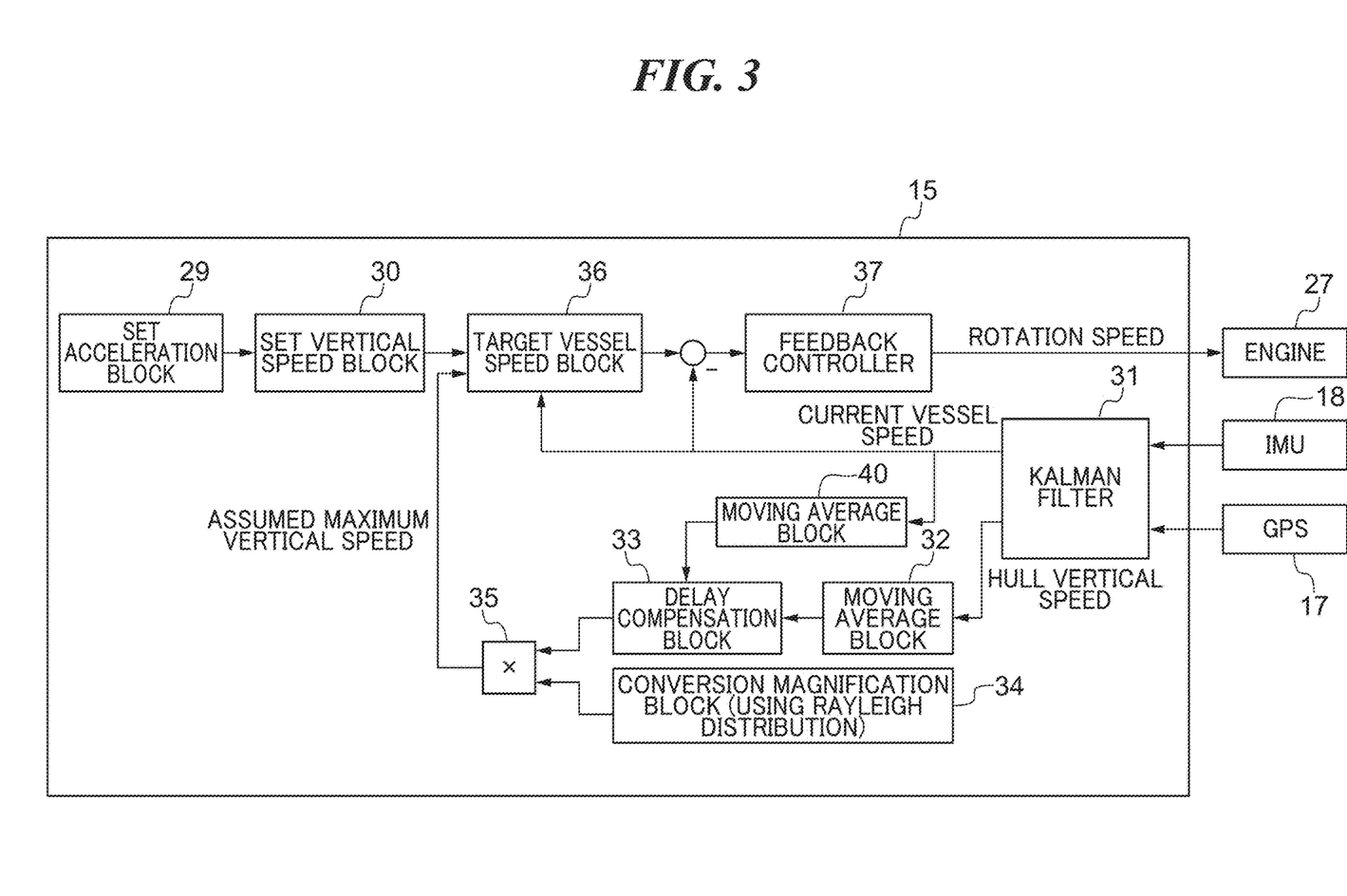
FIG. 3 is a schematic diagram of a speed control controller implemented by a BCU when a speed control method for a marine vessel is executed according to a preferred embodiment of the present invention.

FIG. 3 is a schematic diagram of a speed control controller implemented by the BCU 15 when a speed control method for a marine vessel 10 is executed. Referring to FIG. 3, the speed control controller includes a set acceleration block 29, a set vertical speed block 30, a Kalman filter 31, a moving average block 32, a delay compensation block 33, a conversion magnification block 34, a multiplier 35, a target vessel speed block 36, a feedback controller 37, and a moving average block 40.

In the speed control controller, first, in the set acceleration block 29, the vertical acceleration (hereinafter, referred to as "set acceleration") acceptable by a passenger of the hull 11, which corresponds to the impact applied to the hull 11, is set by the vessel operator.

Figure 4:
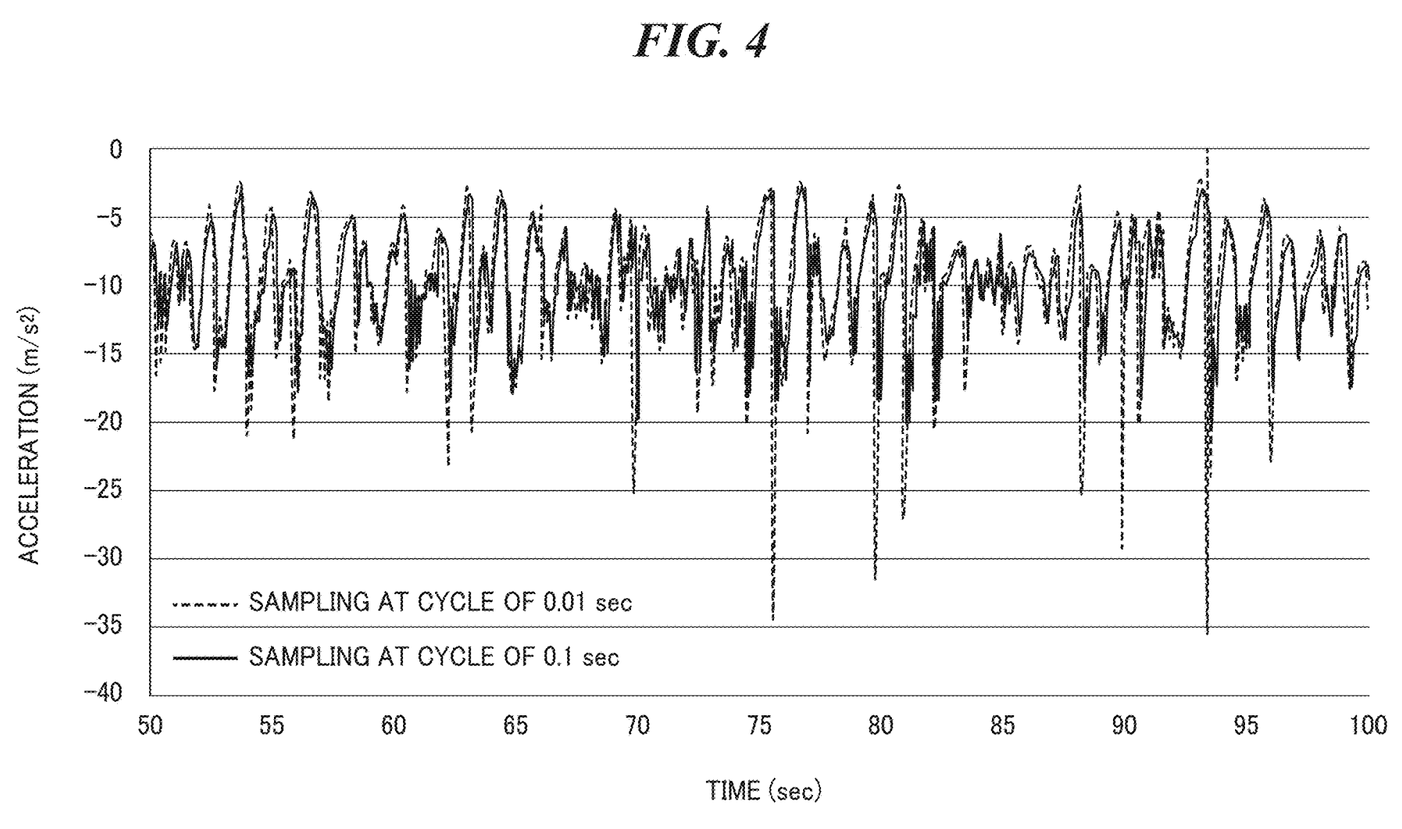
FIG. 4 is a diagram for explaining a state in which a vertical acceleration of a hull varies.

Since the impact is generally expressed by a multiple of the acceleration, it is considered natural to use the vertical acceleration of the hull 11 as a physical quantity in the speed control method for the marine vessel (hereinafter, simply referred to as "speed control") to reduce the impact applied to the hull 11. However, for a relatively small marine vessel, since the vertical acceleration of the hull 11 finely varies in a very fast cycle, it is difficult for the IMU 18 to accurately measure the vertical acceleration. For example, FIG. 4 illustrates a measurement result of the vertical acceleration in a case where the vertical acceleration of the hull 11 of the marine vessel 10 traveling on waves is sampled at a cycle of 0.1 seconds (solid line), and a measurement result of the vertical acceleration in a case where the same vertical acceleration is sampled at a cycle of 0.01 seconds (broken line). When these measurement results are compared with each other, a steep change in vertical acceleration that can be measured when sampling is performed at a cycle of 0.01 seconds cannot be measured in a case where sampling is performed at a cycle of 0.1 seconds. Since the sampling rate of the IMU 18 is generally 0.05 seconds, the IMU 18 cannot accurately measure a steep change in vertical acceleration of the hull 11, and there is a possibility that, in a case where the vertical acceleration of the hull 11, which is measured by the IMU 18, is used, the steep change in vertical acceleration is not applied to the speed control.

On the other hand, since the vertical speed of the hull 11 has a lower value than the value of the vertical acceleration of the hull 11, the steep change does not occur as is distinct from a case of the vertical acceleration of the hull 11, and the change is able to be accurately measured even by the IMU 18. Since the vertical speed of the hull 11 is obtained by integrating the vertical acceleration of the hull 11, the steep change in vertical acceleration is applied to the vertical speed of the hull 11. Therefore, when the vertical speed of the hull 11 is used, as a result, the steep change in vertical acceleration is applied to the speed control. In a preferred embodiment of the present invention, the speed control is performed using the vertical speed of the hull 11 instead of the vertical acceleration of the hull 11 as an index of the impact applied to the hull 11.

Specifically, the speed control controller converts the set acceleration set in the set acceleration block 29 into the vertical speed of the hull 11 in the set vertical speed block 30. Since the vertical speed of the hull 11 is proportional to the square root of the vertical acceleration of the hull 11 (this is a well-known matter), in a preferred embodiment of the present invention, a coefficient K to be used to convert the vertical acceleration of the hull 11 into the vertical speed of the hull 11 is obtained by Equation (1) below.

Mathematical formula 1

$$K = \frac{\sqrt{Az}}{Vz} \quad (1)$$

In Equation (1), $A_Z$ is the vertical acceleration of the hull 11, and $V_Z$ is the vertical speed of the hull 11.

In Equation (1), the moving average value of the square root of the vertical acceleration $A_Z$ of the hull 11 and the moving average value of the vertical speed $V_Z$ of the hull 11 are used to alleviate the influence of a time variation. The coefficient K changes depending on the specifications of the marine vessel 10. Therefore, it is necessary to obtain the coefficient K in advance by measuring the vertical acceleration and vertical speed of the hull 11 for each marine vessel 10. In a preferred embodiment of the present invention, the speed control controller calculates the set vertical speed by multiplying the set acceleration by the reciprocal of the coefficient K in the set vertical speed block 30.

Next, in the Kalman filter 31 of the speed control controller, the vertical speed and current vessel speed of the marine vessel 10 are calculated in real time based on the measurement results of the current position of the marine vessel 10 and the behavior of the marine vessel 10, which are transmitted from the GPS 17 and the IMU 18. In a preferred embodiment of the present invention, the vertical speed of the marine vessel 10 is referred to as a "hull vertical speed", and the current vessel speed of the marine vessel 10 is referred to as a "current vessel speed".

Since the hull vertical speed varies from moment to moment every time the marine vessel 10 travels over the waves, when the hull vertical speed is used as it is for the speed control, the speed control may not converge. In a preferred embodiment of the present invention, the variation in hull vertical speed is smoothed and the speed control is converged by using a vertical speed moving average value (first moving average value) calculated by performing the moving average of the hull vertical speed. Specifically, in the moving average block 32, the moving average of the hull vertical speed is performed over a predetermined period of time and the vertical speed moving average value is calculated.

Figure 5A:
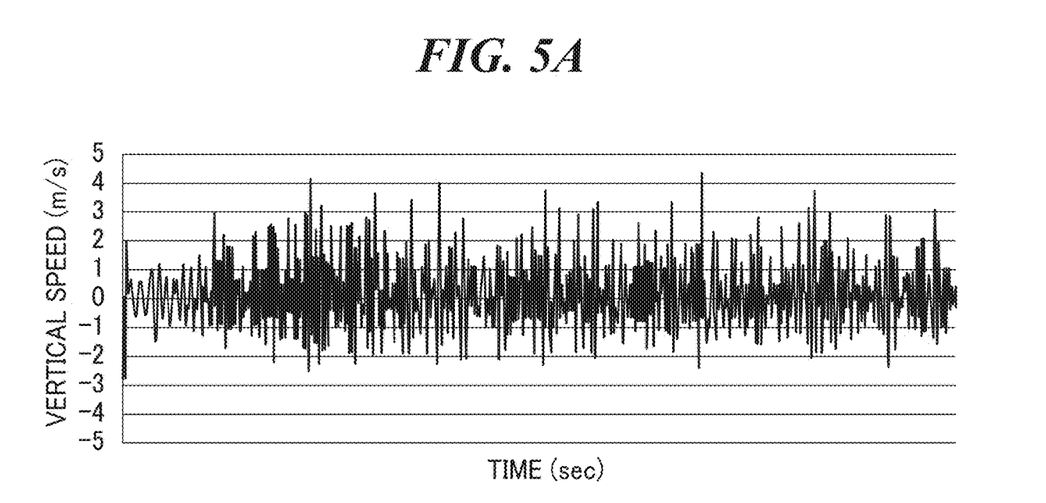
FIGS. 5A and 5B are diagrams for explaining a moving average of a hull vertical speed according to a preferred embodiment of the present invention.
Figure 5B:
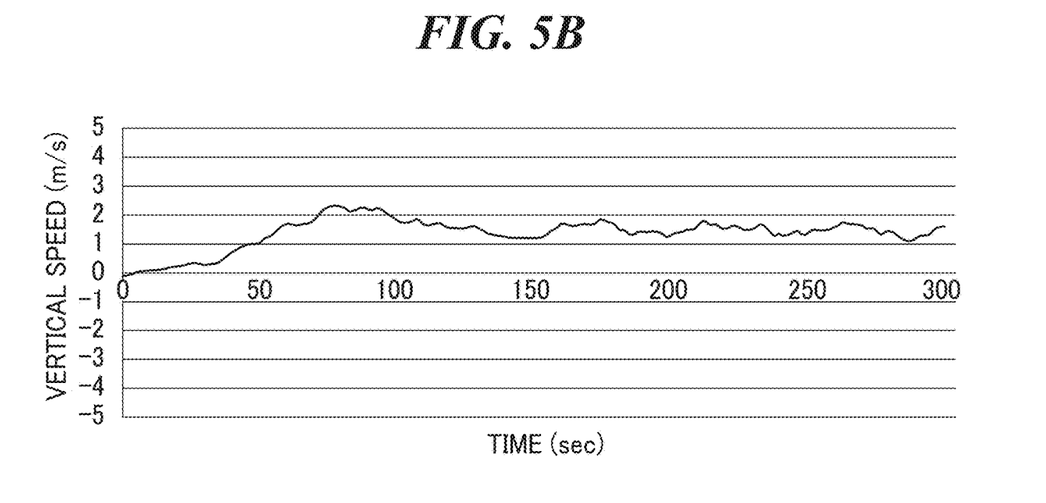

FIGS. 5A and 5B are diagrams for explaining the moving average of the hull vertical speed according to a preferred embodiment of the present invention. In particular, FIG. 5A illustrates the hull vertical speed calculated by the Kalman filter 31, and FIG. 5B illustrates the vertical speed moving average value obtained by the moving average process being performed on the hull vertical speed of FIG. 5A. As illustrated in FIG. 5B, the variation in hull vertical speed is smoothed by the moving average.

Since the vertical speed moving average value has a time delay with respect to a real-time hull vertical speed, the control stability may be impaired when the vertical speed moving average value is used as it is for the speed control. Therefore, in a preferred embodiment of the present invention, in the delay compensation block 33, a prediction value of a current vertical speed moving average value (hereinafter, referred to as "vertical speed moving average prediction value") is calculated from the vertical speed moving average value. Specifically, the moving average value (second moving average value) of the vessel speed is calculated by the moving average process being performed on the vessel speed calculated by the Kalman filter 31 in the moving average block 40. In the delay compensation block 33, a vertical speed moving average prediction value is calculated from the calculated vertical speed moving average value and the moving average value of the vessel speed and the current vessel speed by which the time delay of the vertical speed moving average value is compensated.

Figure 6:
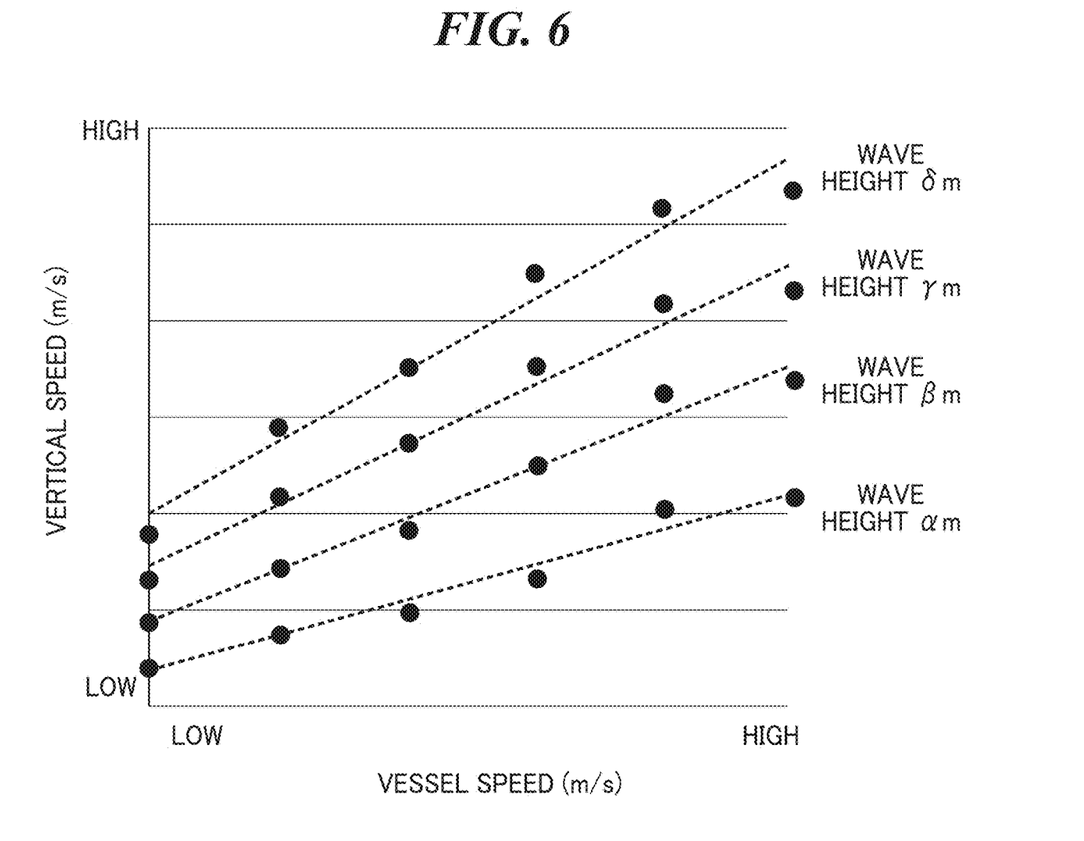
FIG. 6 is a diagram illustrating a relationship between a hull vertical speed and a vessel speed.

Here, through a prior hull motion simulation, the inventor of preferred embodiments of the present invention discovered that the hull vertical speed and the vessel speed have a linear relationship when the wave height is constant, as illustrated in FIG. 6. Accordingly, in a preferred embodiment of the present invention, the vertical speed moving average prediction value $Vz_p$ is obtained by Equation (2) below, wherein Vx is the current speed, $\overline{Vx}$ is moving average value of vessel speed, and $\overline{Vz}$ is vertical speed moving average value.

Mathematical formula 2

$$Vz_p = Vx \frac{\overline{Vz}}{\overline{Vx}} \quad (2)$$

Figure 7:
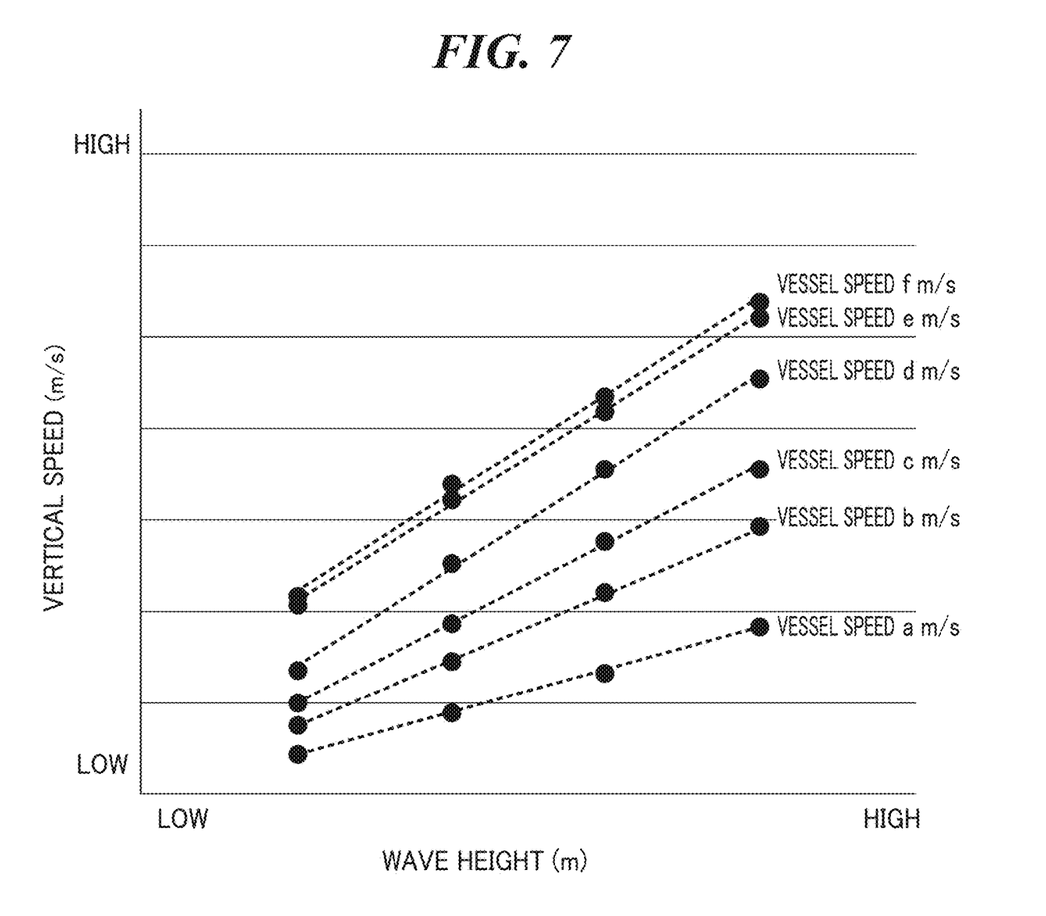
FIG. 7 is a diagram illustrating a relationship between a hull vertical speed and a wave height.

In a preferred embodiment of the present invention, the hull vertical speed is used as an index of the impact applied to the hull 11, which requires the hull vertical speed to be obtained at which the impact is expected to be the maximum in order to mitigate the impact applied to the hull 11. Here, through the prior hull motion simulation, the inventor discovered that a relationship between the hull vertical speed and the wave height is a linear relationship when the vessel speed is constant, as illustrated in FIG. 7. In a preferred embodiment of the present invention, the hull vertical speed (hereinafter, referred to as "assumed maximum vertical speed") corresponding to the maximum wave height is calculated based on the maximum wave height that can occur at the allowable occurrence probability (predetermined probability) (for example, 5%) or less.

A method of using a Rayleigh distribution is known as a method of expressing irregularity of the wave height as a probability distribution, and an occurrence probability density distribution of the wave height follows a Rayleigh probability density distribution. The Rayleigh probability density distribution is expressed by Equation (3) below.

Mathematical formula 3

$$p(A) = \frac{A}{\sigma^2} \exp\left(-\frac{A^2}{2\sigma^2}\right) \quad (3)$$

A relationship between an average wave height $H_{ave}$ and a standard deviation G of the wave height in Equation (3) is expressed by Equation (4) below. When Equation (4) is substituted into Equation (3), a Rayleigh cumulative distribution function of Equation (5) below indicating the occurrence probability density distribution of the wave height is obtained.

Mathematical formula 4

$$\sigma = H_{ave}\sqrt{\frac{2}{\pi}} \quad (4)$$

$$F(x) = 1 - e^{\frac{-x^2}{2\sigma^2}} \quad (5)$$

Figure 8:
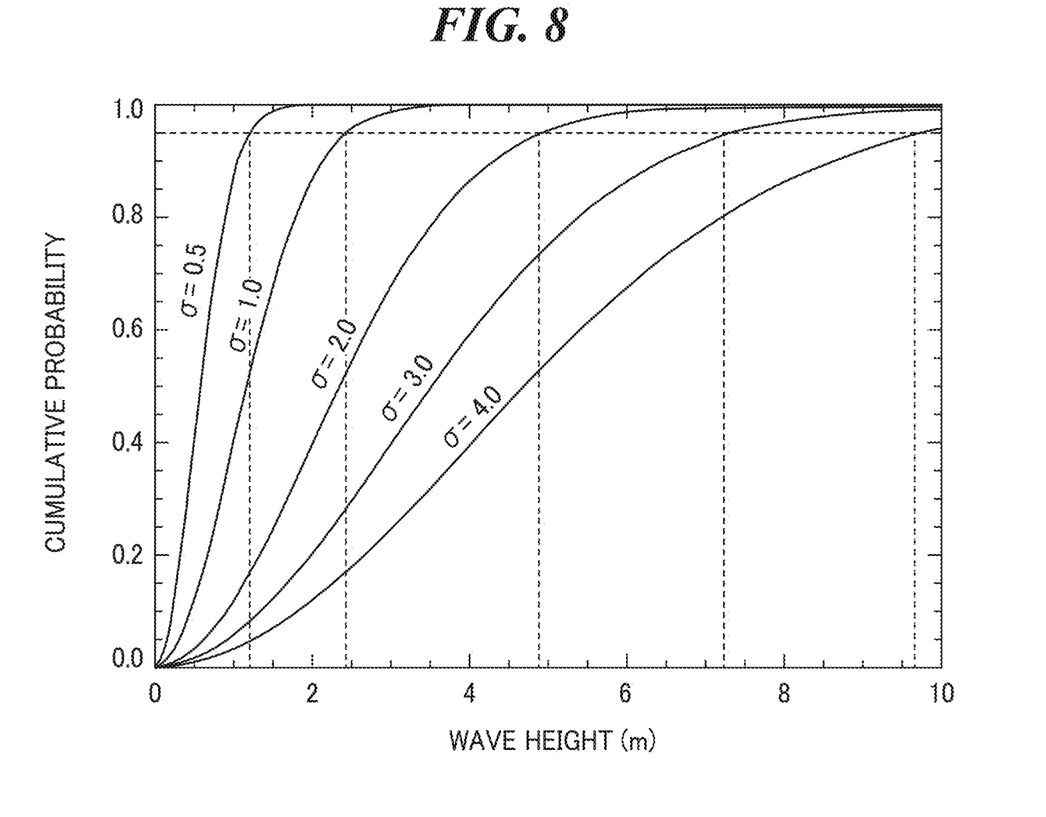
FIG. 8 is a graph illustrating an occurrence probability density distribution of a wave height for each standard deviation of the wave height corresponding to each average wave height.

FIG. 8 is a graph illustrating the occurrence probability density distribution of the wave height for each standard deviation G of the wave height corresponding to each average wave height $H_{ave}$. Each occurrence probability density distribution in FIG. 8 is obtained based on Equation (5). A horizontal axis of the graph of FIG. 8 indicates the wave height that can occur, and a vertical axis of the graph indicates the accumulation of the occurrence probability of the wave height (hereinafter, simply referred to as "cumulative probability"). Here, the maximum wave height (hereinafter, referred to as "assumed maximum wave height") that can occur at the allowable occurrence probability (hereinafter, referred to as "allowable probability") or less is the maximum wave height in the cumulative probability obtained by subtracting the allowable probability from 100% (total occurrence probability) in the occurrence probability density distribution of the wave height. The graph of FIG. 8 is a graph for a case in which the allowable probability is 5%, and the assumed maximum wave height is the maximum wave height for the cumulative probability is 95%. As indicated by a broken line in FIG. 8, the assumed maximum wave height is about 1.2 m for the standard deviation σ of the wave height is 0.5, the assumed maximum wave height is about 2.4 m for the standard deviation σ of the wave height is 1.0, the assumed maximum wave height is about 4.8 m for the standard deviation σ of the wave height is 2.0, the assumed maximum wave height is about 7.2 m for the standard deviation σ of the wave height is 3.0, and the assumed maximum wave height is about 9.6 m for the standard deviation σ of the wave height is 4.0. As can be determined from these figures, a ratio (variation) (hereinafter, referred to as "conversion magnification") of the assumed maximum wave height with respect to the standard deviation σ of the wave height at a certain allowable probability is constant regardless of the standard deviation σ of the wave height, and for example, in a case where the allowable probability is 5%, the conversion magnification is a constant value of 2.4. As indicated in Equation (4), the standard deviation σ of the wave height is a substitution index of the average wave height. Therefore, the conversion magnification of the assumed maximum wave height with respect to the average wave height at a certain allowable probability is constant regardless of the average wave height.

As described above, since a relationship between the hull vertical speed and the wave height is a linear relationship (FIG. 7), the conversion magnification of the assumed maximum vertical speed with respect to the vertical speed moving average value is the same as the conversion magnification of the assumed maximum wave height with respect to the average wave height at a certain allowable probability. In a preferred embodiment of the present invention, in the conversion magnification block 34, the conversion magnification of the assumed maximum wave height with respect to the average wave height at a certain allowable probability is calculated by using the Rayleigh probability density distribution, and in the multiplier 35, the vertical speed moving average prediction value is multiplied by the conversion magnification to estimate the assumed maximum vertical speed. The assumed maximum vertical speed to be estimated here is the maximum hull vertical speed that can occur at the allowable probability or less, and is the maximum hull vertical speed at the cumulative probability obtained by subtracting the allowable probability from 100% (total occurrence probability).

The assumed maximum wave height can be calculated by Equation (6) below, where the allowable probability is u. Note that in a preferred embodiment of the present invention, the conversion magnification of the assumed maximum wave height with respect to the average wave height at a certain allowable probability is only required to be obtained, and it is not necessary to calculate the assumed maximum wave height itself because the conversion magnification is obtained from the occurrence probability density distribution of the wave height obtained based on the Equation (5).

Mathematical formula 5

$$F(u)^{-1} = \sigma\sqrt{2\ln\left(\frac{1}{1-u}\right)} \quad 0 < u < 1 \quad (6)$$

Since the allowable probability depends on the preference of the vessel operator or the passenger (to what extent the impact can be allowed), the allowable probability is not limited to 5%, and any value can be used. For example, the MFD 16 may be configured such that the vessel operator is able to set the allowable probability.

Next, in the target vessel speed block 36 of the speed control controller, the target vessel speed is calculated based on the assumed maximum vertical speed, the set vertical speed, and the current vessel speed. The target vessel speed is a vessel speed at which impact applied to the hull 11 can be kept at the magnitude that the passenger allows, and corresponds to the set vertical speed. The assumed maximum vertical speed is also considered as the maximum vertical speed that can be reached when the marine vessel 10 travels at the current vessel speed. Therefore, the current vessel speed corresponds to the assumed maximum vertical speed. As described above, the relationship between the hull vertical speed and the vessel speed is a linear relationship (FIG. 6). Accordingly, a ratio of the set vertical speed with respect to the assumed maximum vertical speed is the same as a ratio of the target vessel speed with respect to the current vessel speed. Based on this idea, in the target vessel speed block 36, the target vessel speed is determined by multiplying the current vessel speed by the ratio of the set vertical speed with respect to the assumed maximum vertical speed.

Next, in the feedback controller 37 of the speed control controller, the correction amount with respect to the current rotation speed of the engine 27 is determined based on a difference between the target vessel speed and the current vessel speed, and the corrected rotation speed of the engine 27 is transmitted to the engine ECU 28 of the outboard motor 12. Accordingly, feedback control to make the vessel speed approach from the current vessel speed to the target vessel speed is executed.

In a preferred embodiment of the present invention, the BCU 15 repeats the above-described process to execute the speed control method for the marine vessel.

According to a preferred embodiment of the present invention, the target vessel speed is determined based on the vertical speed moving average value of the hull 11. The vertical speed moving average value does not vary from moment to moment every time the marine vessel 10 travels over the wave, as is distinct from the vertical speed or vertical acceleration of the hull 11. Therefore, the target vessel speed determined based on the vertical speed moving average value of the hull 11 also does not vary from moment to moment and changes relatively smoothly. As a result, the acceleration and deceleration of the hull 11 is able to be prevented from being repeated frequently, and thus the ride comfort of the marine vessel 10 is further improved.

In a preferred embodiment of the present invention, the BCU 15 executes feedback control to make the current vessel speed approach the target vessel speed corresponding to the set vertical speed, which is an index of the allowable impact applied to the hull 11. This structure makes it possible to prevent the vessel speed from being unnecessarily lowered, and to improve the ride comfort of the marine vessel 10 and prevent delay of arrival to the destination as well.

In a preferred embodiment of the present invention, a vertical speed moving average prediction value calculated by delay compensation being performed on the vertical speed moving average value is used instead of the vertical speed moving average value of the hull 11, and thus it is possible to avoid control instability caused by a time delay of the vertical speed moving average value with respect to the real-time hull vertical speed.

In a preferred embodiment of the present invention, the Rayleigh probability density distribution is used as the occurrence probability density distribution of the wave height, and it is not necessary to calculate the assumed maximum wave height itself, which simplifies the processes used for the speed control.

Although preferred embodiments of the present invention have been described above, the present invention is not limited to the preferred embodiments described above, and various modifications and changes can be made within the scope of the gist of the present invention.

For example, although in the above-described preferred embodiments, the speed control method for the marine vessel is executed using the vertical speed moving average value, the speed control method for the marine vessel may be executed using the moving average value of the vertical acceleration of the hull 11 (hereinafter, simply referred to as "vertical acceleration moving average value"). It is noted that the inventor discovered, by a hull motion simulation in advance, that a relationship between the vertical acceleration of the hull 11 and the wave height is not a linear relationship, and further, that a relationship between the square root of the vertical acceleration of the hull 11 and the wave height is a linear relationship. Therefore, in a case where the vertical acceleration moving average value is used, in actuality, the above-described conversion magnification is calculated from the Rayleigh probability density distribution by using the moving average value of the square root of the vertical acceleration of the hull 11, and the speed control method for the marine vessel is executed.

Figure 9:
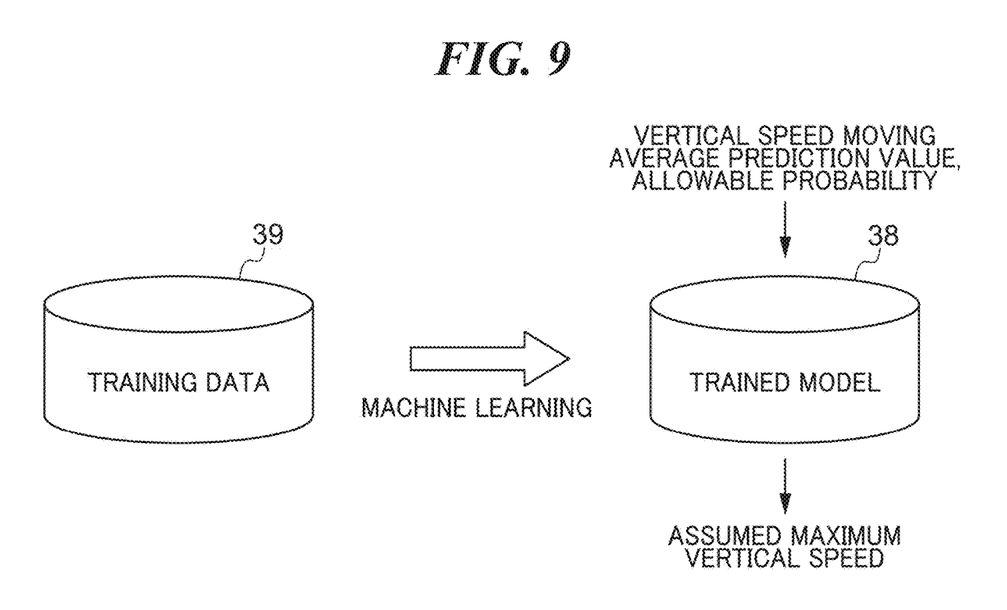
FIG. 9 is a diagram for explaining a trained model that outputs an assumed maximum vertical speed.

In an above-described preferred embodiment, the assumed maximum vertical speed is calculated based on the vertical speed moving average prediction value, the Rayleigh probability density distribution, and the allowable probability. However, the calculation for the assumed maximum vertical speed is not limited to this. For example, instead of using the Rayleigh probability density distribution, the vertical speed moving average prediction value and the allowable probability may be input to a trained model 38 configured as a convolutional neural network, and the assumed maximum vertical speed may be predicted by the trained model 38. As illustrated in FIG. 9, the trained model 38 is implemented by machine learning using training data 39. The trained model 38 is configured to output the assumed maximum vertical speed when the vertical speed moving average prediction value and the allowable probability are input to the trained model 38. Here, the training data 39 includes a large number of vertical speed moving average prediction values and the allowable probability values, and the assumed maximum vertical speed is associated with the vertical speed moving average prediction values and the allowable probability values. Note that the trained model 38 may be configured to output the conversion magnification when the vertical speed moving average prediction value and the allowable probability value are input.

Although the marine vessel 10 includes the outboard motor 12 in the above-described preferred embodiments, the marine vessel 10 to which the speed control method for the marine vessel according to the present invention is applied may include an inboard motor or an inboard/outboard motor instead of the outboard motor 12. Although the marine vessel 10 includes the engine 27 which is an internal combustion engine as a power source in the above-described preferred embodiments, the marine vessel 10 to which the speed control method for the marine vessel according to the present invention is applied may include an electric motor as the power source instead of the engine 27, or may include both the engine 27 and the electric motor. Although the marine vessel 10 is a planing boat in the above-described preferred embodiments, the marine vessel 10 to which the speed control method for the marine vessel according to the present invention is applied is not limited to the planing boat, and may be a relatively small displacement type main vessel or a hydrofoil vessel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A speed control method to control a speed of a marine vessel, the speed control method comprising:
   using a controller to determine a target vessel speed based on a first moving average value which is a moving average value of a vertical speed of a hull, or a moving average value of a vertical acceleration of the hull, and based on an occurrence probability density distribution of a wave height;

using the occurrence probability density distribution of the wave height to estimate an assumed maximum vertical speed as the vertical speed of the hull corresponding to an assumed maximum wave height which is a maximum wave height that can occur at a predetermined probability or less; and control the speed of the marine vessel based on the to determine step.

2. The speed control method according to claim 1, further comprising:

performing a delay compensation of the first moving average value.

3. The speed control method according to claim 2, wherein in the delay compensation, a prediction value of the current first moving average value is calculated based on the first moving average value, a current vessel speed, and a second moving average value which is a moving average value of the vessel speed.

4. The speed control method according to claim 1, wherein the occurrence probability density distribution of the wave height follows a Rayleigh probability density distribution.

5. The speed control method according to claim 4, wherein a relationship between an average wave height and the assumed maximum wave height is expressed by a Rayleigh cumulative distribution function; and the speed control method further comprises estimating the assumed maximum vertical speed based on a ratio of the assumed maximum wave height with respect to the average wave height and on the first moving average value.

6. The speed control method according to claim 1, wherein the predetermined probability is 5%.

7. The speed control method according to claim 1, wherein the speed control method uses a trained model, and the speed control method further comprises:

inputting the first moving average value and a predetermined probability value to the trained model; and predicting, by using an output of the trained model, an assumed maximum vertical speed which is a vertical speed of the hull corresponding to an assumed maximum wave height which is a maximum wave height that can occur at the predetermined probability value or less; wherein the trained model is implemented by machine learning using, as training data, the assumed maximum vertical speed associated with the first moving average value and the predetermined probability value.

8. The speed control method according to claim 1, further comprising:

calculating the target vessel speed from a set vertical speed as a vertical speed of the hull, which corresponds to an allowable degree of impact applied to the hull, from the assumed maximum vertical speed, and from a current vessel speed.

9. The speed control method according to claim 8, further comprising:

performing feedback control for a propulsive force of a propulsion device of the marine vessel based on the target vessel speed and the current vessel speed.

10. The speed control method according to claim 1, further comprising:

calculating a vertical speed of the hull or a vertical acceleration of the hull based on a behavior of the hull using a Kalman filter.

11. The speed control method according to claim 10, wherein the behavior of the hull is measured using an inertial measurement unit.

12. A marine vessel comprising:

a controller configured or programmed to control a vessel speed by determining a target vessel speed based on a moving average value of a vertical speed of a hull, or a moving average value of a vertical acceleration of the hull, and on an occurrence probability density distribution of a wave height; wherein the occurrence probability density distribution of the wave height estimates an assumed maximum vertical speed as the vertical speed of the hull corresponding to an assumed maximum wave height which is a maximum wave height that can occur at a predetermined probability or less; and the controller controls the vessel speed.

* * * * *